March 8, 1966 H. D. BARTLETT ETAL 3,238,694

MATERIAL HANDLING DEVICE

Filed Sept. 14, 1964 7 Sheets-Sheet 1

INVENTORS
HOWARD D. BARTLETT
WILLIAM B. CRAWFORD
BY
*Stowell & Stowell*
ATTORNEYS March 8, 1966 H. D. BARTLETT ETAL 3,238,694

MATERIAL HANDLING DEVICE

Filed Sept. 14, 1964 7 Sheets-Sheet 2

INVENTORS
HOWARD D. BARTLETT
WILLIAM B. CRAWFORD
BY
Stowell & Stowell
ATTORNEYS

March 8, 1966 H. D. BARTLETT ETAL 3,238,694

MATERIAL HANDLING DEVICE

Filed Sept. 14, 1964 7 Sheets-Sheet 3

INVENTORS
HOWARD D. BARTLETT
WILLIAM B. CRAWFORD

BY Stowell & Stowell

ATTORNEYS

March 8, 1966 H. D. BARTLETT ETAL 3,238,694

MATERIAL HANDLING DEVICE

Filed Sept. 14, 1964 7 Sheets-Sheet 4

*INVENTORs*
HOWARD D. BARTLETT
WILLIAM B. CRAWFORD
*BY*
Stowell & Stowell
ATTORNEYS

INVENTORS
HOWARD D. BARTLETT
WILLIAM B. CRAWFORD

BY Stowell & Stowell
ATTORNEY

MATERIAL HANDLING DEVICE

Filed Sept. 14, 1964 7 Sheets-Sheet 6

INVENTORS
HOWARD D. BARTLETT
WILLIAM B. CRAWFORD

BY Stowell & Stowell
ATTORNEYS

MATERIAL HANDLING DEVICE

Filed Sept. 14, 1964

INVENTORS
HOWARD D. BARTLETT
WILLIAM B. CRAWFORD

BY Stowell & Stowell
ATTORNEYS

United States Patent Office 3,238,694

Patented Mar. 8, 1966

3,238,694

MATERIAL HANDLING DEVICE

Howard D. Bartlett, State College, Pa., and William B. Crawford, Topeka, Kans., assignors to Research Corporation, New York, N.Y., a corporation of New York Filed Sept. 14, 1964, Ser. No. 396,818
15 Claims. (Cl. 53—58)

This application is a continuation-in-part of our copending application Serial No. 178,195 filed March 7, 1962 for "Material Handling Device," now abandoned.

This invention relates to improvements in material handling devices and, in particular, to devices for conveying, segregating, orienting and sequentially packaging generally ovoidal bodies on axially unsymmetrical ellipsoids of revolution.

The invention is illustrated as embodied in apparatus for conveying, segregating, orienting and sequentially packaging of eggs.

Principal objects of the present invention are to provide such a device that is positive in operation, relatively inexpensive to manufacture, reliable in operation, and adaptable to large and small egg handling farms and processing plants.

A further object is to provide such a device whereby eggs may be conveyed, segregated, oriented and sequentially packed in a continuous, and low cost manner with a minimum of egg breakage.

These and other objects and advantages are provided in a mechanism for conveying and segregating generally ovoidal bodies comprising an elongated conveyor bed adapted to support ovoidal bodies, the surface of the bed being generally transversely level and having a width greater than the length of the major axis of the ovoidal bodies to be supported thereon, and means for individually urging the ovoidal bodies to be conveyed along the bed; and further means for orienting said ovoidal bodies so that all of the bodies are positioned with their more pointed ends toward one side of the conveyor bed; and further means for sequentially directing said ovoidal bodies into a container.

Other objects and advantages of the present invention will be apparent to those skilled in the art from the following detailed description of an operational embodiment of the present invention disclosed in the accompanying drawings wherein.

Figure 1:
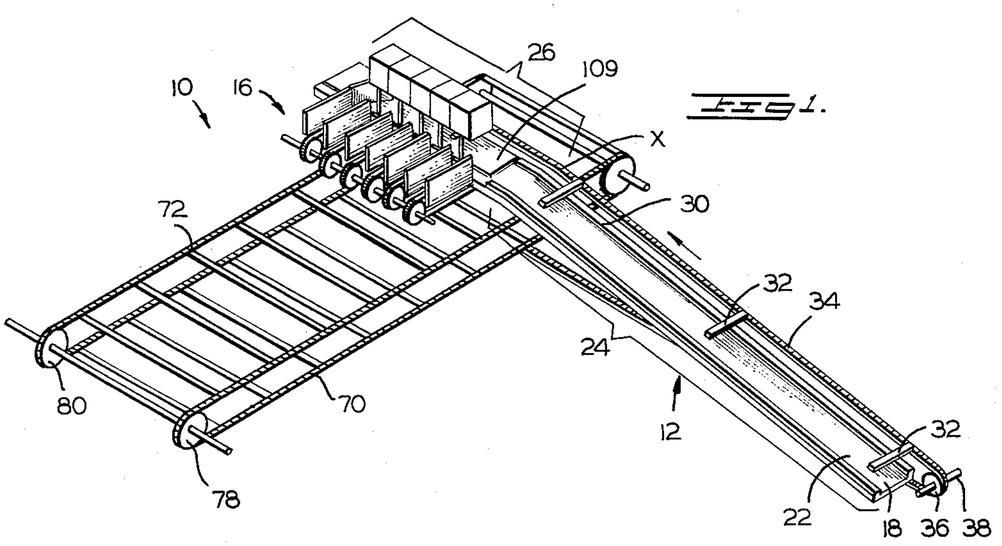
FIG. 1 is a perspective view of an egg conveying, segregating and sequential packaging mechanism embodying the principles of the present invention.

Referring to the drawings, the invention is embodied in an egg handling machine generally designated 10 which comprises an egg conveying and segregating device 12, egg orienting means 14 more clearly shown in FIGS. 9 through 12 and egg packaging means 16.

*Conveying and segregating mechanism*

It has been discovered that egg-shaped ovoidal bodies or axially unsymmetrical ellipsoid of revolution when urged along a level bed with the major axes of the egg-shaped bodies positioned generally normal to the longitudinal axis of the bed that the egg-shaped bodies will also move transversely of the longitudinal axis of the bed in the direction of the sharper or smaller end of the egg-shaped bodies.

Figures 2, 3:
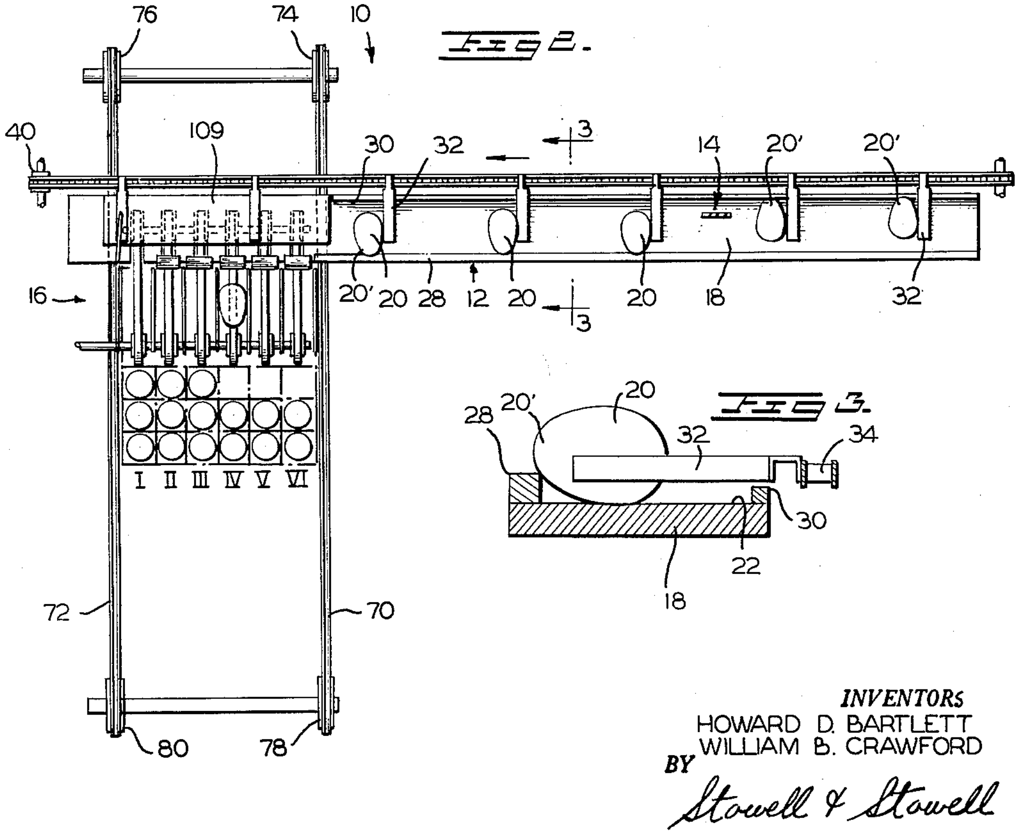
FIG. 2 is a top plan view of the apparatus shown in FIG. 1 with five eggs on the inclined portion of the conveyor, the lower two of which are improperly oriented.
FIG. 3 is an enlarged sectional view substantially on line 3—3 of FIG. 2.
Figure 4:
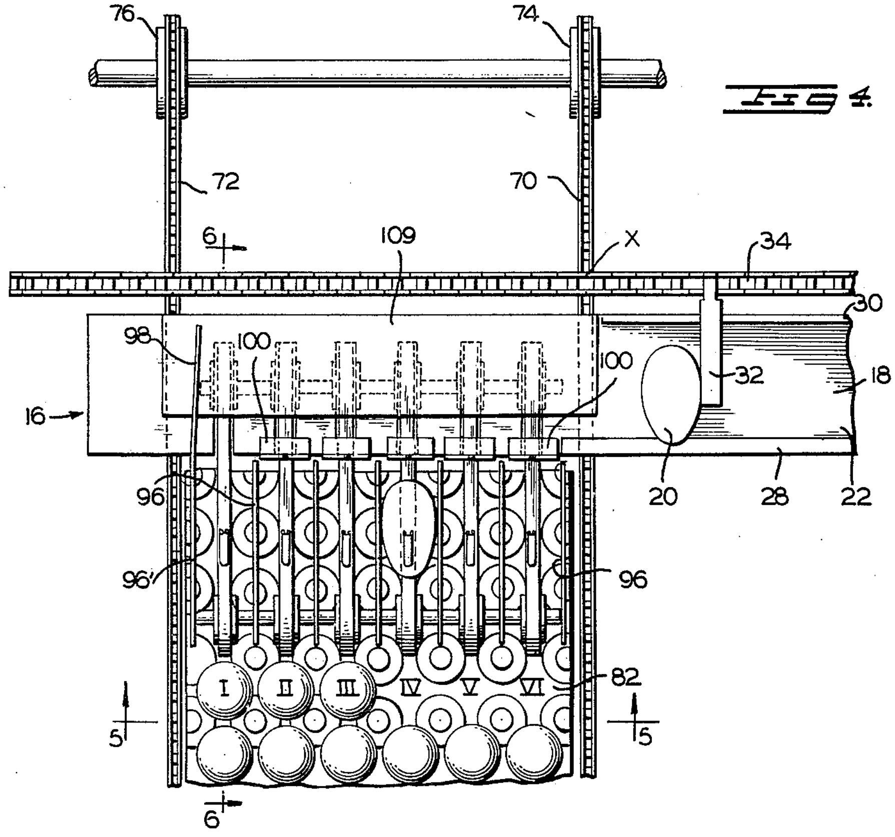
FIG. 4 is an enlarged fragmentary top plan view of the sequential egg packaging mechanism of the invention.
Figures 9, 10, 11, 12:
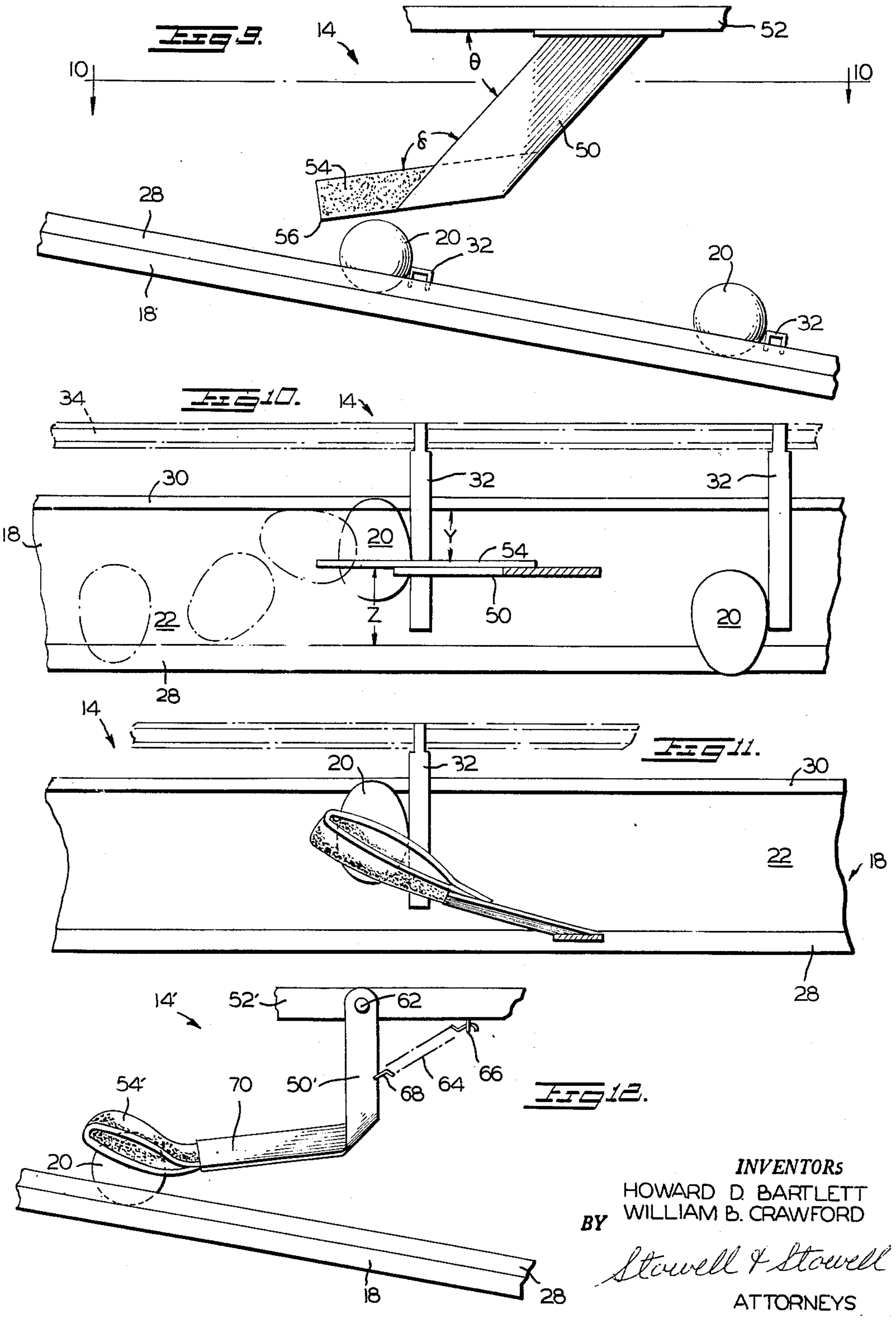
FIG. 9 is an enlarged fragmentary elevational view of a preferred form of egg-orienting and turning mechanism of the invention.
FIG. 10 is a section substantially on line 10—10 of FIG. 9.
FIG. 11 is a top plan view of a modified form of egg-orienting and turning device.
FIG. 12 is a fragmentary elevational view of the structures shown in FIG. 11.

Referring particularly to FIGS. 1, 2 and 3, the egg conveying and segregating mechanism 12 generally comprises a bed 18 which is adapted to support ovoidal bodies illustrated as eggs 20. The surface 22 of the bed is generally transversely level and has a width greater than the length of the major axis of the ovoidal bodies to be conveyed thereon. In the illustrated form of the invention, the bed 18 is shown as having an inclined section 24 and a generally horizontal section 26. Along each of the lateral edges of the bed 18 is secured an edge members 28 and 30, respectively. In the illustrated form of the invention, the edge member 28 has a height greater than edge 30; however, both of the edges may be substantially the same height without effecting the operation of the conveying and segregating mechanism. In general, the height of the edge members 28 and 30 is such that movement of an egg transverse to the longitudinal extension of the bed 18 is stopped when the egg comes in contact with one of the edges and is positioned substantially as illustrated in FIGS. 3, 4 or 10.

Where eggs are being conveyed along a bed having an overall width of about 4 inches, a satisfactory height for edge member 28 may be about ½" and the height of edge member 30 may be about ¼".

The ovoidal bodies are moved along the bed 18 of the conveying and segregating mechanism by a plurality of pusher rods or elements 32 secured to links of an endless chain 34. The chain 34 passes about an idler sprocket 36 suitably mounted as at 38 adjacent one end of the conveyor bed and about a drive sprocket 40 suitably mounted at the other end of the bed 18. As is well known in the art, the chain 34 may be provided with suitable guide means along its length and particularly at points such as X where the bed 18 changes from a sloping bed to a horizontal bed to maintain the height of the pusher rods 32 at a predetermined position relative to the surface 22 of the bed. In general, the pusher elements should be positioned so that the ovoidal bodies to be conveyed are contacted below their major axes and pusher bars having a height above the bed 22 of the conveyor of about ½" for normal sized eggs has been found to be very satisfactory. Further, spacing the bars 32 about 8 inches apart and terminating the bars about ½" from the edge member 28 will provide for satisfactory operation.

Each one of the bars 32 is intended to convey and segregate one ovoidal body at a time so that in operation, the ovoidal bodies are spaced during conveying and segregation substantially as illustrated in FIG. 2.

An egg being conveyed along the bed 18, in the direction of the directional arrows, is caused to move in a direction such that its smallest or sharpest end 20′ points in the direction of lateral movement. As illustrated in FIG. 2, the first three ovoidal bodies 20 are facing with their small ends in contact with edge member 28 while the remaining two bodies are facing with their small ends 20′ in contact with edge member 30. Thus, it will be seen that the mechanism not only conveys the eggs longitudinally along the surface 22 of the bed 18 but also the ovoidal bodies are segregated along either edge 28 or edge 30 depending upon the position of the small end of the body during conveyance of the body.

It will be appreciated that if edge 28 and edge 30 were discontinued at some point along the bed 18, the eggs would laterally move off the bed to a pair of collecting stations on opposite sides of the bed whereby the eggs being conveyed may be separately packaged with their small ends pointing downwardly.

Where a single packaging device is to be employed with all of the small ends of the eggs pointing in the same direction, an egg orienting or turning device is employed with the conveying and segregating mechanism.

*Egg orienting device*

It has been found that eggs or other ovoidal objects can be turned end-for-end by the use of a generally resilient or flexible arm positioned with relation to the bed of the conveyor such that the larger end of the ovoidal element, to be rotated 180°, is forced under and against the flexible or resilient turning means as the ovoidal member is transported along the conveyor bed. The resilient or flexible property of the turning member is necessary to impart slight lateral pressure on the larger end of the ovoidal object as it passes under and against the orienting structure. The member thus restricts the forward motion of the large end of the ovoidal body causing it to pivot about its minor axis and become positioned with its major axis parallel to the longitudinal axis of the conveyor bed and with the smaller end of the object positioned in the direction of movement of the conveyor chain. Further, lateral pressure on the ovoidal object by the orienting device forces the object to pivot further, in its original pivoting direction, thereby reversing the ovoidal object end-for-end.

In FIGS. 9 and 10 of the drawings, one form of object orienting structure, which provides very satisfactory end-for-end turning of certain of the segregated ovoidal objects, is illustrated and generally comprises an arm member 50 supported from a suitable rigid frame member 52 to depend over the surface 22 of the conveyor bed 18. In the illustrated form of the invention, the arm 50 is inclined in the direction of movement of the eggs 20 at an angle $\theta$ of about 50°. The lower end of the arm 50 terminates above the surface 22 and has secured thereto a flexible or resilient arm member 54. The arm member 54 may be constructed of rubber or synthetic rubber-like materials and satisfactory results have been attained with a strip about ⅛″ wide, 1″ thick and about 3½″ long when positioned at an angle $\alpha$ of about 140° to the supporting arm 50. As more clearly illustrated in FIG. 9, the most forward edge 56 of the flexible turning element 54 is positioned at a height above the surface 22 of the bed 18 such that the object to be oriented will be contacted by the member above a horizontal plane through its major axis. Further, as illustrated in FIG. 10, the resilient member 54 is positioned a distance Y from conveyor side edge 30 such that the resilient member will contact the object to be rotated on the remote side of a plane passing vertically through the minor axis of the ovoidal object. Further, where only those objects passing along the edge 30 are to be contacted by the resilient member 54, the distance Z between the resilient member 54 and the edge 28 should be great enough to permit free passage of a correctly oriented egg past the resilient member.

In FIGS. 11 and 12 of the drawings, a modified form of orienting mechanism is illustrated. In this form of the invention, the orienting mechanism 14′ includes an arm member 50′ having a generally vertically extending upper portion pivotally mounted as at 62 to a fixed support member 52′. Resilient means, illustrated as helical spring 64, has one end connected as at 66 to the support 52′ and the other end connected to the arm 50′ at 68. The spring member normally maintains the arm 50′ in the vertical position. The lower portion 70 of the arm 50′ extends toward the conveyor deck 22 at a vertical angle of about 30° between the arm and the surface 22 and across the deck diagonally at a horizontal angle of about 35° to the line of travel of the ovoidal body illustrated as egg 20. To the lower extended end of arm portion 70 is secured a rubber strip 54′ formed by folding a strip of resilient rubber-like material and attaching the material through its ends to the arm 70. The rubber strip 54′, in its undeformed position, lies at an angle of approximately 45° to the surface 22 of the deck 18. The arm and the rubber strip are, therefore, positioned such that an egg 20 having the small end in contact with side edge member 30 will be contacted by the rubber strip adjacent the large end whereby when the egge contacts the resilient member 54′, the egg 20 is turned about its minor axis as the egge moves up the surface 22 and as the egg passes the tip of the resilient member 54′ a downward and lateral force imposed by the spring member 64 deflects the trailing edge of the egg an additional 90° to accomplish 180° rotation or proper orientation of the eggs.

Figure 14:
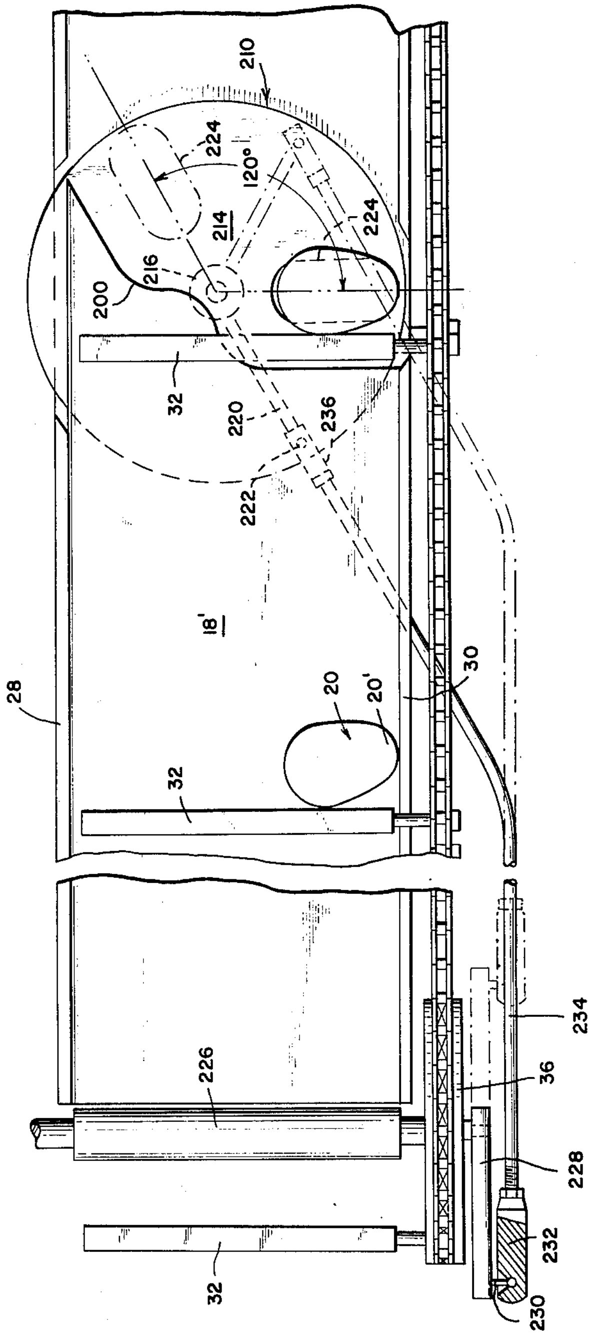
FIG. 14 is a fragmentary top plan view of a further form of egg-orienting and turning means.
Figure 15:
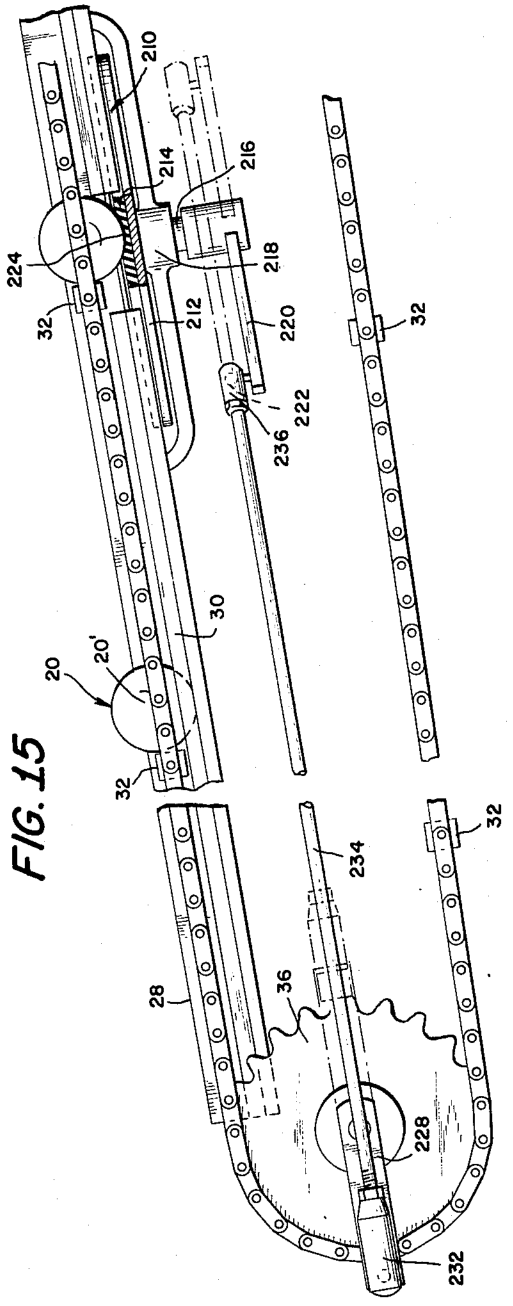
FIG. 15 is a side elevational view of the structures shown in FIG. 14.

In FIGS. 14 and 15 of the drawings a further form of egg orienting and turning mechanism is illustrated. In this form of the invention a portion of the bed 18′ of the conveyor is cut out as shown at 200 and below said bed and the cutout portion 200 is mounted a disc 210. The disc 210 consists of a base member 212 and a top member 214. The top member 214 consists of a thin sheet of foam rubber or other sheet material which will provide a nonslip top surface for the disc.

The disc is provided with a depending shaft 216 mounted in a bearing 218 supported from a bracket carried by the conveyor and not shown in the drawings.

A shaft or pin 220 having a ball end 222 is secured to the shaft 216 whereby when the pin is moved in a plane normal to the shaft 216 the shaft and the disc 210 are rotated in a plane parallel to the bed 18′ of the conveyor.

The top of the disc 210 is provided with an egg receiving recess 224 so that an egg positioned in the recess will rotate with the disc 210.

The shaft 226 carrying idler sprocket 36 has secured thereto a crank arm 228 and crank 230. The extended end of crank 230 is ball-shaped and receives a socket 232 of arm member 234. The other end of arm member 234 has mounted thereon a further socket 236 which engages ball end 222 of pin 220.

The length of the crank, the arm 234 and the pin 220 and the position of egg receiving indentation 224 are so selected and oriented that with each rotation of the shaft 226 the egg receiving indentation 224 moves 120° and then back, e.g., from its dotted line position to its full line position as shown in FIG. 14. Further, since the crank is turned by the shaft for the idler sprocket of the conveyor, the disc oscillates in synchronization with the flight travel. Thus, if an egg 20 has its small end 20′ toward edge member 30, its pusher rod 32 will urge the egg into indentation 224 and rotation of the disc will swing the egg forward ahead of its pusher rod 32 in an arc of about 120°. This turns the egg sufficiently so that the advancing pusher rod engages the egg on the other side of its vertical axis which, in turn, causes the egg to continue turning 180° from its initial position and become oriented with the small end toward edge 28.

Instead of the crank and arm mechanism which oscillates the disc 210, the disc 210 could be rotated in synchronization with the conveyor flight travel and bring about the orienting and turning of the eggs. However, the illustrated oscillating motion above described with reference to FIGS. 14 and 15 is simple in construction and effective in use.

*Packaging mechanism*

The ovidal body conveying, segregating and orienting mechanism is particularly adaptable to use in conjunction with an improved sequential packaging mechanism. Referring in particular to FIGS. 4, 5, 6, 7 and 8, an improved sequential packaging mechanism is illustrated. The sequential packaging mechanism 16 generally includes a pair of conveyor chains 70 and 72 positioned below and at right angles to the conveyor bed 18. The conveyor chains 70 and 72 are trained about a pair of drive sprockets 74 and 76, respectively, at one end and a pair of idler sprockets 78 and 80 at the opposite end. The conveyor formed from the chains 70 and 72 support, for example, egg receiving cartons or the like 82. The chains 70 and 72 convey in sequential manner rows of spaces formed in the cartons 82 in alignment with the end of a superposed conveying mechanism generally designated 84. The conveying mechanism 84 comprises a pair of shafts 86 and 88, one of which is driven by a suitable motor means not shown with the shafts having secured thereto a plurality of belt receiving pulleys 90, on shaft 86, and 92, on shaft 88. In the illustrated form of the invention, there are provided six pulleys on each of the shafts to provide six conveying passageways, designated I through VI, one for each of the egg receiving recesses in a row of a carton 82. It will be appreciated that the number of pulleys on each shaft would correspond to the desired number of elements to be packaged in a row.

A conventional V-belt 94 having a flat upper surface extends about each of the pairs of pulleys 90 and 92 as illustrated in the drawings. Referring to, for example, FIG. 4 of the drawings, it will be seen that the belts 94 extend from a position at least in a line with the edge member 28 of the conveyor bed 18 to a discharge point directly vertically above a row of spaces in the carton 82 to be filled.

The channels I through VI for the passage of the eggs to be packaged are defined by pair of generally vertically extending side walls 96 with the outer side wall 96′ of channel I having an extended portion 98 which projects over the bed of the conveyor and prevents passage of a body to be packaged beyond said point.

The other wall members 96 extend only to about a line forming a continuation of the edge member 28.

Figure 5:
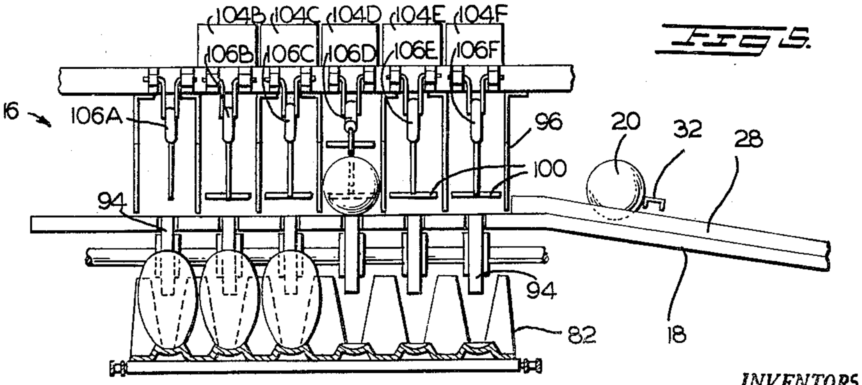
FIG. 5 is a section substantially on line 5—5 of FIG. 4.

It will be particularly noted from FIG. 5 that the edge member 28 terminates at about the first wall member 96 of passageway or channel VI. However, the edge member is in effect continued by short generally horizontally extending platforms 100, each of which is movably positioned to form a gate for each of the channels except channel I.

Figure 6:
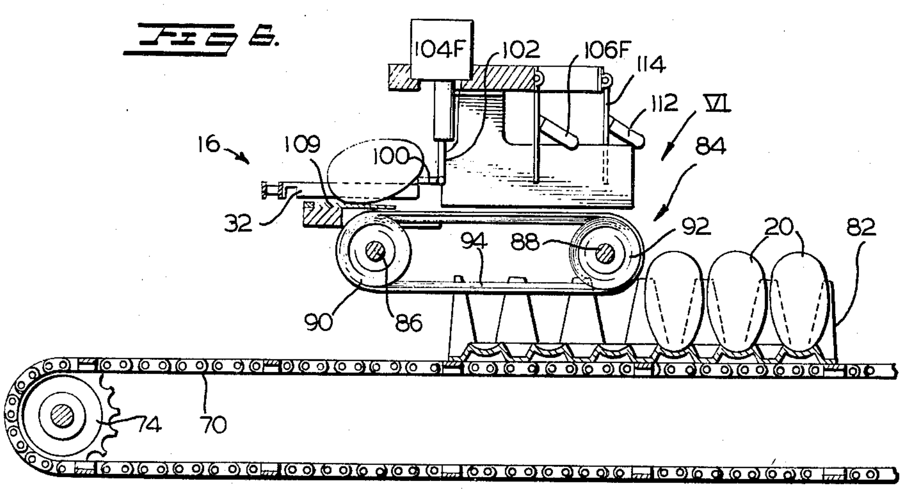
FIG. 6 is an enlarged fragmentary vertical section substantially on line 6—6 of FIG. 4.
Figures 7, 8:
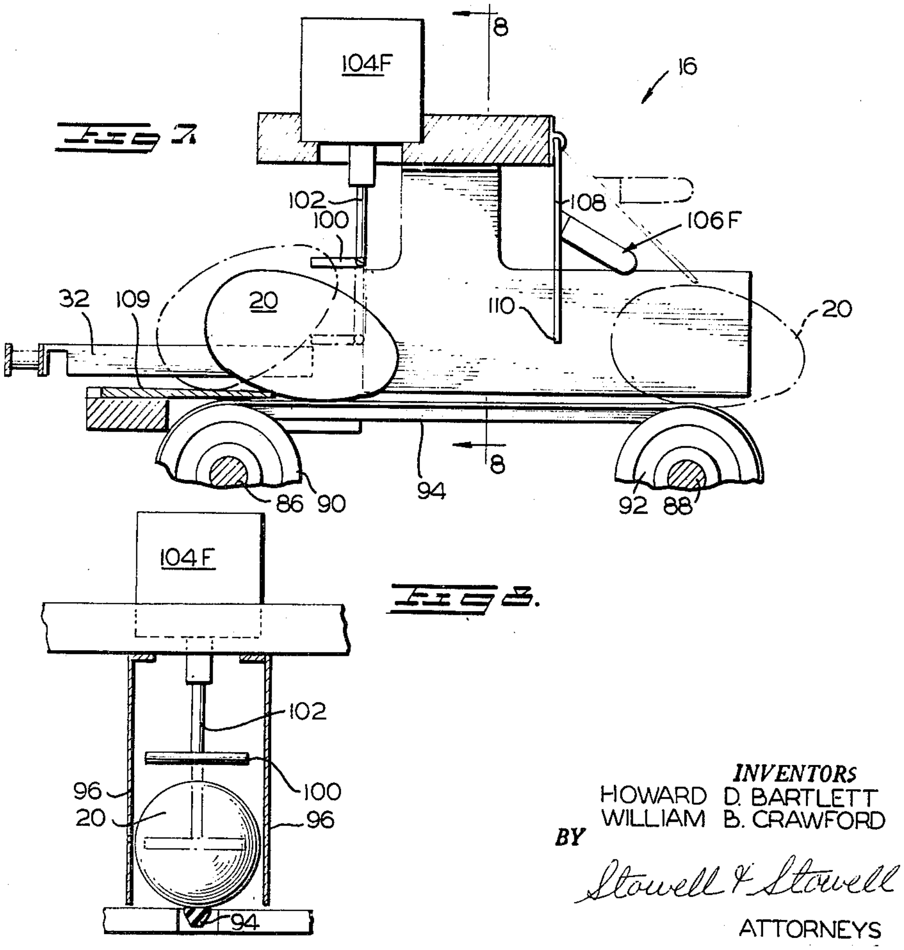
FIG. 7 is a fragmentary diagrammatic view of a portion of the mechanism shown in FIG. 6 illustrating the operation of one of the sequentially operated egg packaging structures of the invention.
FIG. 8 is a section substantially on line 8—8 of FIG. 7.

Each of the platforms 100 is suspended in the position shown in full lines in FIG. 6 by a vertical arm 102 which arm is connected adjacent its upper end to the movable element of, for example, an electrically actuated solenoid designated 104F, whereby when these solenoids are energized, the rods 102 are urged vertically upwardly which, in turn, move the respective platforms 100 upwardly to a position as shown in full lines in FIGS. 7 and 8. The vertical movement of the platforms 100 is such that sufficient clearance is provided between the upper surface 22 of the bed 18 and the undersurface of the platforms 100 to permit the passage of the bodies to be packaged.

The assembly also includes a mercury switch secured to a pivotally mounted bracket 108 for each of the egg packaging channels. The switches are designated 106A through 106F for channels I through VI, respectively. The length of each of the pivotally mounted brackets 108 is such that the lower ends 110 are contacted by an ovoidal body passing through the channel to pivot the arm and its attached switch to a position as shown in dotted lines in FIG. 7 of the drawings. The switches 106A–F are oriented, in attaching the switches to their respective brackets 108, such that the switches are normally "open" and are urged to the switched "closed" position by the passage of an ovoidal body through the channels.

Referring to FIG. 6 of the drawings, the channel VI mounting switch 106F also mounts a further switch 112 secured to a pivotally mounted bracket 114 substantially like brackets 108. The switch 112, like switches 106A through 106F is oriented such that when the bracket 114 is in the position illustrated in FIG. 6, the switch is "open" and when the bracket and switch are pivoted upwardly by the passage of an ovoidal body through the channel, the electrical circuit within which the switch 112 is connected is "closed."

Figure 13:
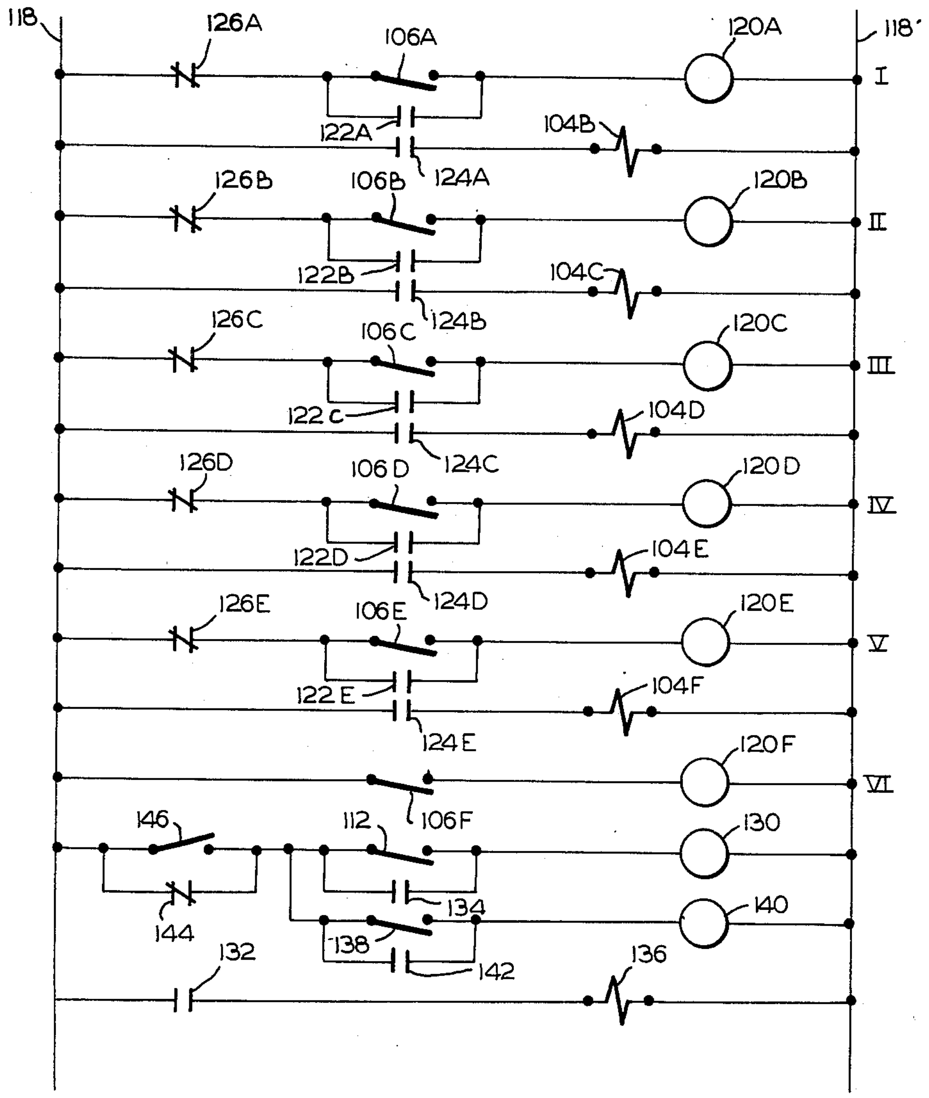
FIG. 13 is a wiring diagram for sequencing of the packaging mechanism.

Referring to, for example, FIGS. 4, 5 and 13, at the beginning of a cycle an egg being conveyed along the bed 18 after having passed the orienting means 14 will pass to the most remote end of the bed 18 as the small end of the egg engages the guide member 28 and its extensions 100 carried at the extended end of each of the solenoid actuating arms 102. When the particular egg reaches a position opposite the channel I, the egg will move on to the respective belt 94 as there is no side support member 100 at this position to maintain the egg on the surface 22. Without the restraining effect of either the lateral guide member 28 or its extensions 100, the egg will be urged at right angles to the longitudinal extension of the bed 18. Advantageously, the conveyor bed may be provided with a laterally sloping surface member 109, adjacent the packaging mechanism 16, to assist in the lateral movement of the ovoidal bodies into the lateral channels I through VI. As the egg comes in contact with normally open switch 106A, solenoid 104B in egg channel II is energized through its control relay. The next egg passes through channel II actuating normally open mercury switch 106B which energizes solenoid 104C and de-energizes solenoid 104B. This sequence continues until an egg has passed through each of the channels I through VI and then the sequence repeats.

The electrical connections between the plural switches, solenoids and control relays will be described in detail with reference to FIG. 13 which shows a circuit diagram for sequenching of the solenoid operated gates or platforms. In FIG. 13 the reference characters correspond to those employed in describing FIGS. 1 through 8.

Referring to FIG. 13, the first egg entering channel I actuates normally open mercury switch 106A to energize control relay 120A. Control relay 120A is thus connected to the source of current through conductors 118 and 118′ and closes normally open switches 122A and 124A. Switch 122A maintains the flow of current to control relay 120A after the egg passes mercury switch 106A. Switch 124A, when closed, brings about the energization of solenoid 104B, lifting its connected gate, whereby the next egg passes through channel II. In passing through channel II, the second egg actuates mercury switch 106B to energize control relay 120B. Control relay 120B opens normally closed switch 126A, de-energizing control relay 120A which, in turn, de-energizes solenoid 104B. Control relay 120B also closes normally open switches 122B and 124B. Switch 122B bypasses mercury switch 106B to maintain the energization of control relay 120B. Closing of switch 124B brings about the energization of solenoid 104C. This sequence continues through the actuation of the switches in channels III and IV. The switch 106D in channel IV energizes the solenoid 104E whereby the next egg will pass through channel V. An egg passing through channel V actuates normally open mercury switch 106E to energize control relay 120E. Control relay 120E opens normally closed switch 126D and closes normally open switches 122E and 124E. The closing of switch 124E bypasses the now open mercury switch 106E to maintain the energization of control relay 120E. Closing of switch 124E energizes solenoid 104F in channel VI. The next egg will then pass through channel VI and in its passage will close normally open mercury switch 106F. Closing of mercury switch 106F energizes control relay 120F which opens normally closed switch 126E. As soon as the egg passes switch 106F, it opens, de-energizing control relay 120F which, in turn, closes switch 126E. The egg then contacts normally open switch 112 to energize control relay 130. Control relay 130 closes switches 132 and 134. Closing of switch 132 energizes solenoid 136 which actuates the drive mechanism for the conveyor mechanism supporting the egg receiving carton 82 to position the next empty row in egg receiving position. Switch 134 bypasses mercury switch 112 to maintain the energization of control relay 130.

As the carton supporting conveyor moves a cam on the conveyor closes normally open switch 138 to energize control relay 140 which closes switch 142 to maintain energization of control relay 140 after switch 138 returns to its normally open position.

Control relay 140 also opens normally closed switch 144. When the next egg receiving row of the carton 82 is aligned with the ends of conveyor unit 84, a further cam on the carton supporting conveyor opens normally closed switch 146. Opening of switch 146 stops the conveyor by de-energizing control relays 130 and 140. De-energization of control relay 140 permits normally closed switch 144 to return to the closed position to provide a bypass circuit around switch 146 which is held open by the stopping of the egg carton carrying conveyor and permits sequence repeating when an egg closes switch 112 in egg channel VI.

From the foregoing description, it will be seen that the present invention provides new and improved means for conveying, segregating, and sequentially packaging generally ovoidal or egg-shaped members. It will be appreciated by those skilled in the art that various modifications may be made in the form of the apparatus specifically disclosed in this application for illustrative purposes without departing from the scope of the appended claims.

We claim:

1. Mechanism for conveying and segregating generally ovoidal bodies comprising an elongated continuous surface substantially planar bed adapted to support ovoidal bodies and over which the ovoidal bodies are caused to traverse, the surface of said bed being generally horizontal in a plane transverse to the longitudinal axis of the surface of said bed and having a width greater than the length of the major axis of the ovoidal bodies to be supported thereon, guide means along the opposed lateral edges of the surface of said bed, said guide means extending upwardly from the surface of said bed and adapted to prevent the ovoidal bodies from moving off the continuous surface of the bed during their transportation therealong and means for transporting said ovoidal bodies along the bed, said transporting means including ovoidal body engaging elements for individually urging the ovoidal bodies along the bed and selectively aligning them with their major axes transverse to the surface of the bed.

2. Mechanism for conveying and segregating generally ovoidal bodies comprising an elongated continuous surface substantially planar bed adapted to support ovoidal bodies and over which the ovoidal bodies are caused to traverse, the surface of said bed being generally horizontal in a plane transverse to the longitudinal axis of the surface of said bed and having a width greater than the length of the major axis of the ovoidal bodies to be supported thereon, guide means along the opposed lateral edges of the surface of said bed, said guide means extending upwardly from the surface of said bed and adapted to prevent the ovoidal bodies from moving off the continuous surface of the bed during their transportation therealong, and means for transporting said ovoidal bodies along the bed, said transporting means including ovoidal body engaging elements for individually urging the ovoidal bodies along the bed and selectively aligning them with their major axes transverse to the surface of the bed, said means for urging the bodies along the bed comprising an endless draft member, means mounting said draft member for endless travel with one run thereof being adjacent and generally aparallel to the elongated substantially planar bed, and ovoidal body engaging rod means secured in spaced relationship to said draft member.

3. The invention defined in claim 2 wherein the continuous surface substantially planar bed includes an inclined section followed by a generally longitudinally horizontal section.

4. Mechanism for conveying and segregating generally ovoidal bodies comprising an elongated continuous surface substantially planar bed adapted to support ovoidal bodies thereon, upstanding edge members along opposite side edges of the bed, the surface of said bed being generally transversely horizontal and having a width between the said edge members greater than the length of the major axis of the ovoidal bodies to be supported thereon, means for individually urging the ovoidal bodies along the bed and selectively aligning them with their major axes transverse to the surface of the bed, said means comprising a plurality of rod members supported by an endless draft member mounted to direct said rod members in spaced relationship over the upper surface of the bed at a position to contact the ovoidal bodies supported thereon, means for orienting said ovoidal bodies as they are urged by said rod members over the surface of the bed to rotate 180° the ovoidal bodies positioned with their more pointed end toward one of said edge members of the bed, further means for sequentially directing said ovoidal bodies into an ovoidal body receiving container, said sequentially directing means comprising a plurality of parallel ovoidal body transporting means positioned with their receiving ends at the remote end of the bed and their longitudinal axes generally normal to the length of the bed, and ovoidal body actuatable gate means sequentially closing the receiving ends of the nearest through the next to the farthest of the plurality of the ovoidal body transporting means.

5. The invention defined in claim 4 wherein said gate means comprise movable continuations of said one of said edge members.

6. The invention defined in claim 5 wherein each of said gate means is connected to a solenoid and ovoidal body actuatable switch means positioned in said transporting means, said switch means being electrically connected to said solenoids.

7. Mechanism for conveying and segregating generally ovoidal bodies comprising an elongated continuous substantially flat planar bed for supporting the ovoidal bodies, the surface of said bed disposed transversely horizontal and being of a width greater than the length of the major axes of the ovoidal bodies to be supported thereon, said bed having spaced substantially co-extensive upwardly extending side edge portions; means for individually urging the ovoidal bodies along the surface of said bed, said urging means selectively aligning the ovoidal bodies with their major axes transverse to the longitudinal axis of the surface of said bed; means for orienting the ovoidal bodies so that all of the bodies are positioned with their more pointed end toward one of said side edge portions of said bed; and means for sequentially directing the ovoidal bodies into a container, said means including a plurality of parallel ovoidal body transporting means positioned with their receiving ends at the remote end of said bed and having their longitudinal axes generally normal to the longitudinal axis of said bed, and ovoidal body actuatable gate means sequentially closing the receiving ends of the nearest through the next to the farthest of said plurality of ovoidal body transporting means.

8. The invention defined in claim 7 including ovoidal body receiving container means positioned at the discharge ends of said plurality of ovoidal body transporting means.

9. The invention defined in claim 7 wherein said means for orienting the ovoidal bodies comprises a generally resilient member positioned above said bed and adapted to rotate 180° the ovoidal bodies positioned with their more pointed end toward the other of said side edge portions of said bed.

10. The invention defined in claim 7 wherein said means for urging said ovoidal bodies along said bed comprises an endless draft member, means mounting said draft member for endless travel with one run thereof being adjacent and generally parallel to the surface of said bed, and ovoidal body engaging rod means secured in spaced relationship to said draft member.

11. The invention defined in claim 7 wherein said bed includes an inclined section followed by a generally longitudinally horizontal section.

12. The invention defined in claim 1 including means for orienting said ovoidal bodies so that all of the bodies are positioned with their more pointed end toward one side edge of the bed.

13. The invention defined in claim 7 wherein the means for orienting said ovoidal bodies so that all of the bodies are positioned with their more pointed end toward one side edge of the bed comprises a generally resilient member positioned above the bed with its lower end positioned to contact ovoidal bodies on the bed and to thereby rotate 180° the ovoidal bodies positioned with their more pointed end toward one of the edges of the bed.

14. Mechanism for conveying and segregating generally ovoidal bodies comprising an elongated continuous surface substantially planar bed adapted to support ovoidal bodies, the surface of said bed being generally horizontal in a plane transverse to the longitudinal axis of the surface of said bed and having a width greater than the length of the major axis of the ovoidal bodies supported thereon, guide means along the opposed lateral edges of the surface of said bed, said guide means extending upwardly from the surface of said bed, means for individually urging the ovoidal bodies along the bed and selectively aligning them with their major axis transverse to the surface of the bed, and means for orienting said ovoidal bodies so that all of the bodies are positioned with their more pointed end toward one side edge of the bed, said orienting means comprising an opening through said bed, a plate member mounted with its extended surface adjacent the bed opening and in a plane generally co-planar with the bed, an ovoidal body receiving means in one portion of the plate and means for rotating the plate in synchronism with the means for individually urging the ovoidal bodies along the bed.

15. The invention defined in claim 14 wherein the means for rotating said plate member causes said plate member to oscillate in an arc of about 120°.

References Cited by the Examiner

UNITED STATES PATENTS

| | | | |
|---|---|---|---|
| 2,895,589 | 7/1959 | Rostron | 198—33.1 |
| 2,952,106 | 9/1960 | Rostron | 53—55 |
| 3,024,889 | 3/1962 | Reading | 198—33.1 |
| 3,040,868 | 6/1962 | Waters | 198—33.1 |

FOREIGN PATENTS

| | | |
|---|---|---|
| 1,151,432 | 1/1958 | France. |

FRANK E. BAILEY, *Primary Examiner.*

BERNARD STICKNEY, *Examiner.*